Figure 1:
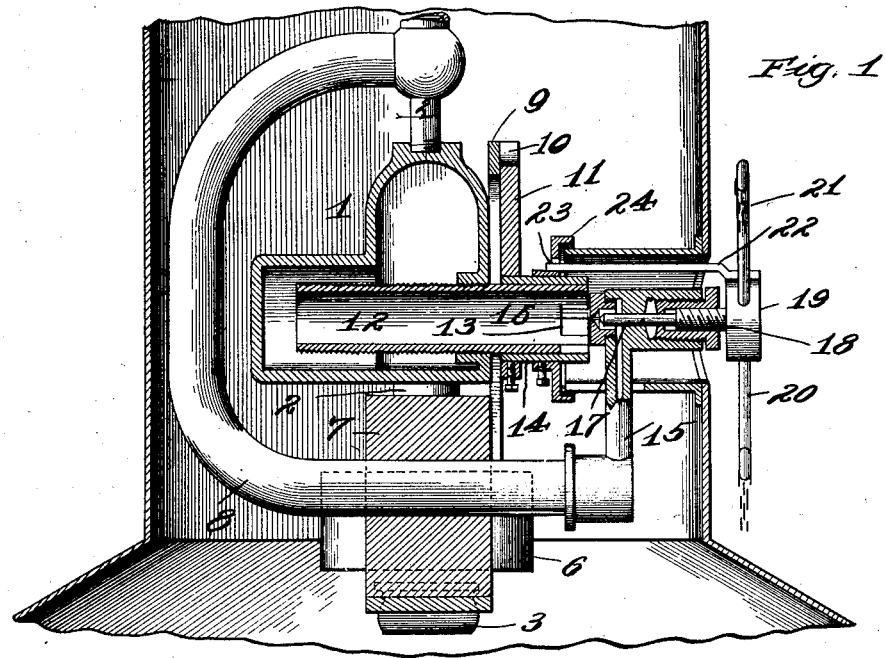

C. K. HARDING.
HYDROCARBON LIGHTING SYSTEM.
APPLICATION FILED SEPT. 29, 1910.

1,010,623. Patented Dec. 5, 1911.

Witnesses:

Inventor:
Charles Knox Harding.

UNITED STATES PATENT OFFICE.

CHARLES KNOX HARDING, OF CHICAGO, ILLINOIS.

HYDROCARBON LIGHTING SYSTEM.

1,010,623.   Specification of Letters Patent.   Patented Dec. 5, 1911.

Application filed September 29, 1910. Serial No. 584,734.

*To all whom it may concern:*

Be it known that I, CHARLES KNOX HARDING, a citizen of the United States, and a resident of Woodlawn, city of Chicago, county of Cook, State of Illinois, have invented certain new and useful Improvements in Hydrocarbon Lighting Systems, of which the following is a specification, which will enable others familiar with the art to make and use the same, reference being had to the accompanying drawings, which form a part thereof.

My invention relates generally to hydrocarbon incandescent lighting systems, and more particularly to gasolene incandescent lights operating on what is known as the high-low system.

The principal object of my invention is to produce an efficient light from the various grades of gasolene, and maintain generation in such a manner that it can be operated for long periods of time without liability of deposits or accumulations of less volatile matter being formed to prevent or interfere with its continuous use.

My invention belongs to that class of lighting devices which are adapted to maintain themselves in a generated or heated condition over long periods of time when no light is required, so as to be in readiness to supply the full amount of light required as soon as an additional supply of fuel is turned on. Heretofore considerable difficulty has been encountered, preventing the attainment of the highest efficiency and economy in lamps of this kind. Where the small flame for generating and the large flame for lighting the mantle are both produced at the same burner gauze in the mantle and their relative size governed by varying the fuel supply, the relative proportions of fuel consumption respectively between the maximum and minimum is not very great. Some lamps of this class have been especially designed for the purpose of reducing the minimum by integrating the vaporizing tube with the burners and other highly heated parts in metallic heat conducting relation. A lamp of this construction will produce a small flame, suitable for maintaining a lamp at the generating temperature with less fuel consumption than would be required for a lamp designed solely for the production of light with the greatest efficiency. But where the burners are too close to the other parts, the combustible mixture becomes too diluted from expansion to produce the best light from the mantles.

As the best conditions of working in both high and low burnings are not identical, according to my invention, I employ in combination in a lighting device, means for maintaining generation of the lamp most suitable for a small consumption of oil and means consisting of a modified adjustment of some of the parts for the production of light, whereby the best construction for the production of light may be attained without sacrificing anything necessary to secure the maintenance of the lamp in a generated condition in the most economical manner.

Figure 2:
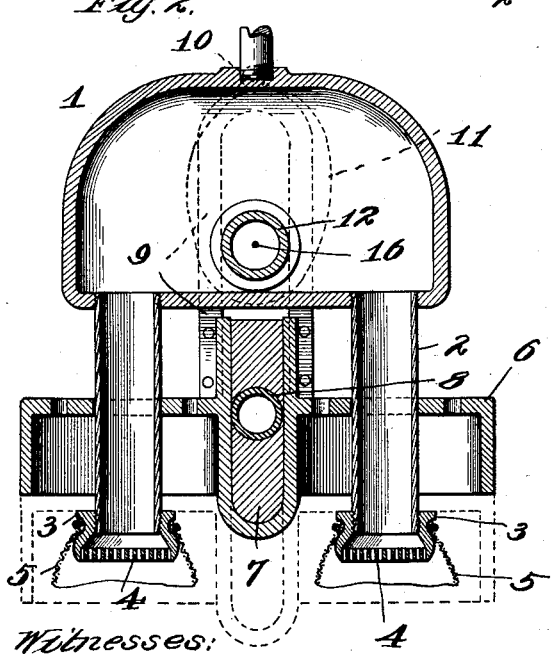
Figure 3:
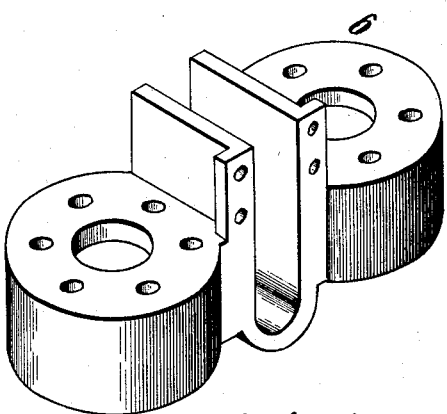

In the drawings which illustrate one form of my invention Figure 1 shows a vertical central section of the stationary and moving parts of a pendant lamp. Fig. 2 is a section on line 2—2 of Fig. 1, and shows a section through the burner body, burner tubes, the burners carried by the tubes a section through the stationary vaporizer and the adjustable heat collecting and conducting metal part, sliding in connection therewith. Fig. 3 is a perspective view of the adjustable heat absorbing, collecting and conducting member 6, adapted to slide in metallic contact with the vaporizer.

As shown in the drawing, the lamp is adapted to operate and permit a relative movement of some of its parts so as to conform to the requirements of two somewhat distinct sets of conditions. Among the desirable conditions when the lamp is burning low, the following may be mentioned; The vaporizing tubes must be kept hot enough at some one point to prevent fractional distillation of the mixed hydrocarbon of which commercial gasolene is composed, and kept hot enough from that point to the vapor discharge orifice to prevent fractional condensation of tarry matter. The velocity of the flow of the vapor from the jet orifice should be lower and the percentage of air taken in with the mixture should be less than when used for incandescing a mantle. A slower velocity of flow of the mixture will permit expanding and superheating the air and vapor without disadvantage as the gauze opening will permit, the passage of the necessary amount even when highly expanded and the heat absorbed by the mixture will be given off at the burner and help heat the vaporizing tube.

For obtaining the maximum efficiency in the production of light the vapor must be discharged from the jet at the maximum velocity obtainable. It must take in a fixed percentage of its weight of air and the mixture passed at as high velocity as possible through the burner and burned in contact with an incandescent mantle at a sufficiently high rate to insure that the quantity of combustible reaching the mantle in a given time is sufficient to raise the temperature as high as possible.

The most perfect mixture is produced by passing the air and vapor at a high velocity through rather long passages between the jet and burner and the mixture should not be expanded and have its calorific value reduced until it has passed through the burner openings to the mantle.

As illustrated in the drawings the moving parts of the lamp are shown in the full lines in the position of the parts when the lamp is burning for the production of light and the dotted lines in Fig. 2 indicating the position when the lamp is burning low.

The burner body 1 carries the downwardly extended burner tubes 2. The burner tubes carry at their lower end the burners 3, having the perforated gauze 4, through which the gas mixture passes, and carry the incandescent mantles 5. The vaporizer 7 is also provided with an adjustable metal heat collecting and conducting piece 6, which is illustrated and shown in Fig. 3, which is supported by the bail 9 having the projecting roller 10 which is acted on by the cam 11.

When the lamp is burning low and the piece 6 is in the position shown by the dotted lines of Fig. 2, the flame will be small and close to the burner and may produce a small amount of light but its main function is to keep the heat absorbing and conducting piece 6, and the vaporizer at a high temperature. In this position the heat conducting piece 6 will be in metallic contact with the heat conveying metal part of the vaporizer surrounding the fuel supply tubes 8. The burner body 1 also carries the Bunsen tube 12 extending horizontally across the central axis of the lamp, and terminating near the vapor discharge orifice. The outer end of the Bunsen tube is largely closed by the end of the valve which contains the vapor jet orifice. The Bunsen tube is provided at its sides near the jet orifice with air inlet ports 13, and is surrounded by a rotating sleeve 14 which is provided with similar air ports so that a partial rotation of the sleeve will open or close the air inlet passages through the ports.

In the operation of the lamp the liquid hydrocarbon enters through the pipe 8 and passes into the vaporizer 7 where it is converted into vapor and the vapor passes through the lateral arm 15 to the jet orifice 16. The discharge from the jet orifice 15 is controlled by inserting or withdrawing a metallic wire about one one-thousandth of an inch smaller than the internal diameter of the orifice. This wire is carried at the end of a rod 17, which extends through suitable packing devices and is provided at its outer end with a screw threaded portion 18, having a very rapid pitch so that approximately a quarter of a revolution will produce motion enough to insert or withdraw the wire from the orifice. The screw 18 is provided on its outer end with a collar 19, having the arms 20 and 21 extending radially and carrying chains depending from their respective ends, so that by pulling down on the chain of arm 20, the collar 19 is rotated to the right and the wire is inserted into the orifice 16, thus reducing the flow. The collar 19 also carries an arm 22 extending inwardly parallel to the rod 17 which engages the sides of an opening 23. In the disk 24 which is mounted on the rotating sleeve 14, the rotating sleeve 14 also carries the cam 11, which engages the roller 10 on the upper portion of the bail 9, which supports the adjustable heat absorbing and conducting piece 6, adapted to surround and inclose a part of the burner and mantles, so that a rotation of the sleeve and cam of about one-fourth of a revolution lowers the piece 6 into the lower position where it is in the most effective heat communicating relation to the vaporizer as it is and in metallic heat conducting relation therewith and close heat absorbing, collecting and communicating relation to the mantles and burners. The rotation of the valve and cam as above described also simultaneously rotates the sleeve 14 and shutter partially closes the air admission posts 13 and reduces the supply of air to the Bunsen tube.

In operating the lamp as by pulling down on the chain connecting arm 20, the various moving parts of the apparatus will be placed in the position best adapted for the maintenance of the lamp in a generated condition with a minimum consumption of fuel. It will be understood that by pulling the opposite chain connected with the arm 21, the vapor discharge orifice will be enlarged, the heat absorbing member will be raised and the burners and mantles will be left in a position more favorable for the distribution of light. The air ports will also be opened permitting the full supply of air to the Bunsen tube.

The burners 4 may be of the usual construction having a perforated gauze 5 in its lower surface through which the gaseous mixture passes to the mantles and being adapted on its outer circumference to hold an inverted mantle 5 which may be tied on or secured to the burner in any suitable manner. The burner gauze may, however, be made with somewhat larger openings than those heretofore successfully used in lamps of ordinary construction because when the oil supply is reduced, the air supply is also simultaneously reduced to such an extent as to prevent the flame from flashing back through the gauze. It is well known that the inflammability of a mixture of hydrocarbon and air as well as the rate of propagation of flame through such a mixture increases very rapidly as the percentage of air approaches the quantity necessary for the complete combustion of the hydrocarbon present in the mixture so that a highly explosive mixture cannot be advantageously used when supplied through gauze openings at a relatively slow velocity, as would be most advantageous to use for the maintenance of the relatively low temperature necessary to maintain a lamp in the generated condition, while for incandescing a mantle the highest velocities of flow and the most inflammable mixture conduce to the highest lighting efficiency.

Having now described my invention and illustrated one method by which it may be carried out, what I claim is:

1. In an apparatus of the character described, a vaporizer having a jet orifice and means for controlling the flow of vapor therefrom, a Bunsen tube and a burner connecting therewith, said bunsen having means for controlling the admission of air thereto, a vaporizer and movable heat absorbing and communicating means adapted to conduct heat thereto in combination with means for simultaneously decreasing the flow of vapor from said jet orifice, decreasing the admission of air to said burner and moving said heat absorbing means into a position more closely surrounding and inclosing the aforesaid burner.

2. In an apparatus of the character described, comprising a vaporizer, a Bunsen tube, a burner communicating with said bunsen in combination with adjustable heat absorbing, collecting and conducting means in heat conducting relation to the said vaporizer and movable into position surrounding and inclosing a large portion of said burner, when the apparatus is operating with the minimum consumption of fuel.

3. In an apparatus of the character described, consisting of a vaporizer, a bunsen, an inverted burner communicating with said bunsen, an inverted incandescent mantle for said burner in combination with a movable radiant energy absorbing and heat conducting means in metallic heat conducting relation to said vaporizer and adjustable into position surrounding and inclosing a portion of the burner and mantle when the lamp is maintaining generation with the minimum consumption of fuel.

4. In an apparatus of the character described, comprising means for producing a combustible mixture of vapor and air, a burner and an incandescent mantle thereon for the production of light, a vaporizer having adjustable metallic extensions therefrom and adapted for surrounding and inclosing a portion of said burner and mantle for absorbing the radiated energy therefrom and vaporizing the hydrocarbon therewith, when the apparatus is adjusted for maintaining generation with the minimum consumption of fuel, and means for removing the aforesaid adjustable mantle inclosing extension when the apparatus is adjusted for the production of light.

5. In an apparatus of the character described, the combination of a burner, a vaporizer having a vapor jet orifice and means for controlling the flow of vapor therefrom, a Bunsen tube having air inlet ports and means for regulating the admission of air thereto and means for simultaneously increasing the flow of vapor and the admission of air or for simultaneously reducing the flow of vapor and simultaneously reducing the admission of air to a relatively greater extent so as to secure a less inflammable combustible mixture.

6. In an apparatus of the character described, the combination of means for simultaneously adjusting a plurality of working parts for the maintenance of generation, including operating means for reducing the flow of vapor, adjustable means for reducing the admission of air, for forming a less explosive combustible mixture, and adjustable heat absorbing means in contact with the vaporizer and surrounding the burner and mantle, to secure the closest heat communicating relation for the most economical maintenance of generation.

In testimony whereof, I have signed my name to this specification in the presence of two subscribing witnesses this 27th day of September, A. D. 1910.

CHARLES KNOX HARDING.

Witnesses:
A. M. FAIRCHILD,
HELEN WILSON.